March 28, 1961 W. B. HORTON 2,976,941
METHOD FOR THERMAL MINERAL PIERCING
Filed May 25, 1956

INVENTOR.
William B. Horton
BY
ATTORNEY

United States Patent Office 2,976,941
Patented Mar. 28, 1961

2,976,941
METHOD FOR THERMAL MINERAL PIERCING

William B. Horton, Concord, Mass., assignor to H. E. Fletcher Co., West Chelmsford, Mass., a corporation of Massachusetts Filed May 25, 1956, Ser. No. 587,328

2 Claims. (Cl. 175—14)

This invention relates to flame working of solid materials and, more particularly, to include methods for thermic disintegration of minerals or mineral-like bodies, especially those which are characterized by some form of grain structure.

A highly important consideration in flame working of mineral bodies is the rate of speed at which the mineral body may be caused to disintegrate into spalled portions. One of the serious problems of flame working of stone, for example, is the occurrence of fusion of the work surface of stone. When fusion takes place, the work surface, at some points, may become plastic and a hot blast can remove material very imperfectly. The fused material fails to spall, and can only be removed very slowly by the flame. It will be appreciated that it is, therefore, desirable to work the stone with a minimum of fusion and a maximum of spalling. Another factor which may have considerable bearing on the rate of spalling is the size of the particles removed. If the particles are thermally disintegrated in the form of a dust or powder, it is indicative of improper utilization of energy from the flame.

Figure 1:
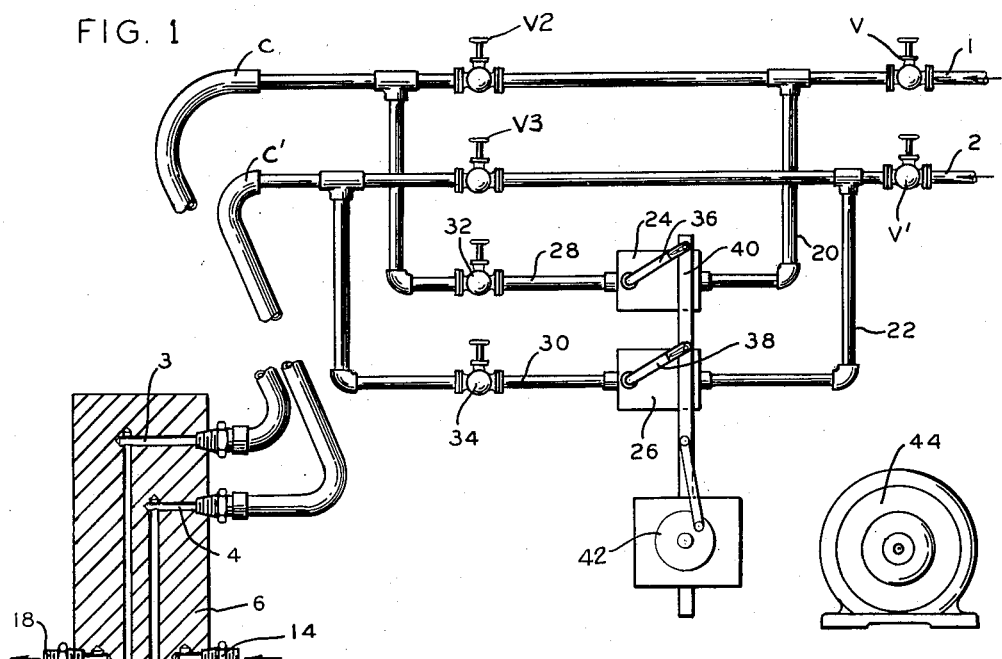
Figure 2:
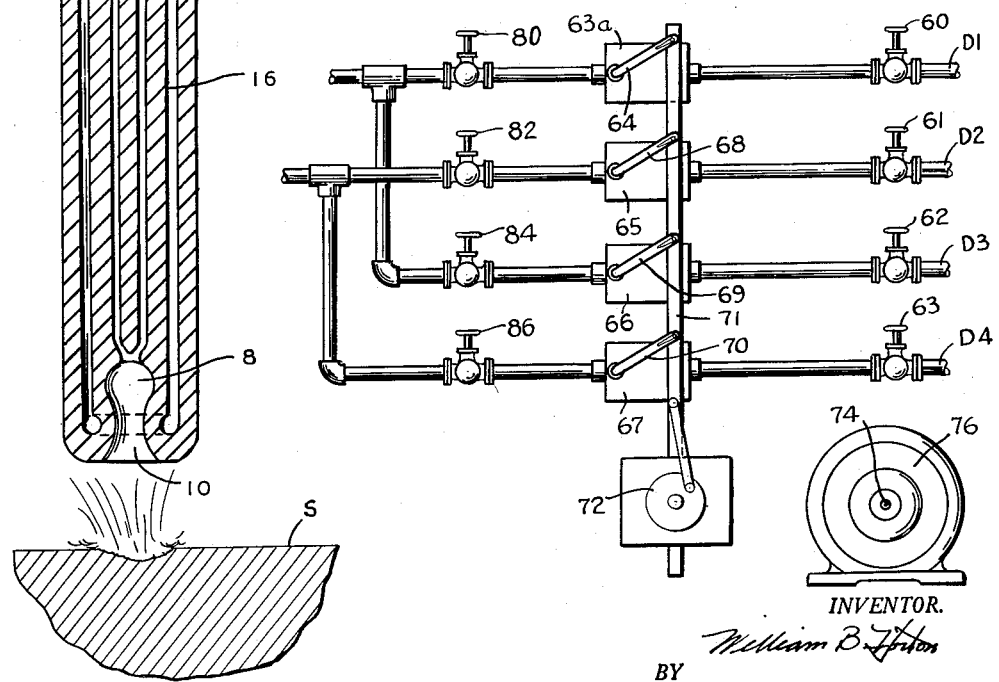

It is an object of the invention to improve methods for flame working minerals or mineral-like bodies subject to the difficulties indicated and to provide for a more rapid removal of spalled material than is now commonly realized while maintaining the occurrence of fusion at a minimum. It is a further object of the invention to devise a method for removing a spalled material substantially all of whose constituent particles lie in a predetermined range of particle sizes. These and other objects and novel features will be more fully understood and appreciated from the preferred embodiments of the invention selected for purposes of illustration as shown in the accompanying drawings, in which Fig. 1 is a diagrammatic view showing in cross-section a burner and in elevation a special valve arrangement for the burner; and Fig. 2 is another diagrammatic view showing a modified form of flame working valve control mechanism.

I have discovered a method of flame working by means of which the desired action of spalling may be induced with a minimum of fusion. I find I may accomplish this desirable objective by establishing an alternating range of flame conditions at the working surface which stimulates spalling and removal of particles before fusion can occur.

It has been observed that the flame energy required to spall a particle is less than that required to fuse it. However, unless a suitable flame condition bears on the particle it will not spall, but will absorb heat until it fuses. It appears that spalling requires the combination of a suitable temperature on the particle, an adequate temperature gradient between it and the surrounding material, and an adequate velocity of blast to carry it away. When the particle receives the proper flame condition it usually spalls readily before fusion can occur.

Most mineral materials may have variations in their structure and composition, and presumably, each particle may vary somewhat from the others as to the particular flame condition which produces optimum spalling effect. Consequently I find it desirable in flame working to present an alternating range of flame conditions at the working surface, so that each particle receives, at some time in the flame cycle, that flame condition which will best stimulate it to spall off.

As one suitable means of producing an alternating range of flame conditions, I have found that I may control combustion of fuel components which are utilized in a flame working apparatus so that a pulsing flame is generated and maintained in effect. This pulsing flame, it is found, operates to accentuate the tendency to spall between surface particles and underlying particles in a conventional type of flame working process.

It is believed that the pulsing flame of the invention operates to provide a relatively low energy flame portion whose principal function is to transfer in a short interval of time a sufficient amount of heat to induce fracturing of constituent grained portions along interfaces thereof; and thereafter a high energy flame portion of the pulsing flame exerts a sudden highly disruptive blasting action which dislodges the loosened or spalled material before fusing can take place.

By way of explanation of this possible theory of operation which is stated as a matter of opinion only, it is further considered that there are many variations in the crystalline or grain structure of a mineral body, such as stone, for example, and therefore some portions may not require as much heat as others in order for spalling to occur.

Referring in detail to the preferred embodiment of flame pulsing apparatus shown in the drawings, I have indicated somewhat diagrammatically, a flame producing unit of the type in which a fuel, such as kerosene and an oxidant such as oxygen, are utilized. These fluids are furnished from suitable containers and conducted through feed inlets 1 and 2. The feed inlet 1 may, for example, supply kerosene and the feed inlet 2 may furnish oxygen under suitable pressure.

The two fuels are passed through shut-off valves V and V' and adjusting valves $V_2$ and $V_3$, conducted along flexible conduits C and C' which communicates with passageways 3 and 4 in a burner member 6. The two fluids are fed through these passageways 3 and 4 and flow into a combustion chamber 8 where they are mixed together and burned to form a flame. This flame emerges at considerable velocity through the orifice 10 and is directed against a surface to be worked. Substantially all of the structure above described is commonly employed in one form or another in carrying out conventional types of flame cutting.

The present invention combines with this structure a means for causing the flame to pulse in a controlled manner, but makes use of a conventional cooling means such as water which enters at an inlet 14, is conducted along a cooling passageway 16 and leaves at an outlet member 18. The means for producing the pulsing action includes fluid bypasses at 20 and 22 which communicate with the conduits C and C' and connect with pulsing valves 24 and 26. At the opposite sides of these pulsing valves are fluid hoses or conduits 28 and 30 which are provided with adjusting valves 32 and 34. From these valves, the conduits lead into the main conduits C and C', as shown.

In accordance with the invention, I provide the valves 24 and 26 with respective actuating arms 36 and 38 which are attached to an actuating rod 40 in turn connected to a crank mechanism 42 driven through an electrical motor 44 or other suitable sort of power. By means of this arrangement, it will be apparent that the actuating bar 40 during reciprocating movement will function to move the valve arms 36 and 38 in some predetermined time cycle and that varying amounts of fuel will be periodically passed through the conductor system into the combustion chamber to produce a flame whose intensity characteristics tend to fluctuate from a relatively low intensity value to a relatively high intensity value.

In operating the apparatus of the invention, the pulsing valves 24 and 26 are manually closed and the flame is adjusted through valves $V_2$ and $V_3$ to obtain a suitable low energy flame. Then, the pulsing valves 24 and 26 are opened and the adjusting valves 32 and 34 are adjusted to produce a suitable high energy flame. With these adjustments having been completed, reciprocating movement of the member 40 is started and the flame emerging from the burner alternates in intensity in accordance with the method of the invention. Such a flame, when directed against a surface S to be worked, will, therefore, produce in alternate succession relatively low temperatures and relatively high temperatures and simultaneously there will be a change in the velocity of the gases.

It is found that by suitably controlling the pulsing flame thus produced desirable effects are achieved including a quicker removal of material with the range of sizes of spalled material which is dislodged being maintained in sizes which are most efficient from a high rate of removal standpoint. Undesirable fusing can be greatly controlled and, in many cases, substantially eliminated and material savings in cost of operation realized.

The method of the invention may be carried out in other desirable ways. For example, I may desire to produce a pulsing flame in which two different classes of fuels are employed or I may produce the pulsing action from alternate sources or oxygen or some other gas under pressure. The structure shown in Fig. 2 of the drawing is intended to illustrate one suitable means of carrying out such an alternating fuel supply.

In the modification of Figure 2, it is intended that the valve arrangement shall be employed with a burner similar to the burner 6 shown in Figure 1, and the connection and valving arrangement operates in the manner generally described in reference to Fig. 1.

Specifically, reference characters D1, D2, D3 and D4 denote conduits for conducting respectively, as shown in Fig. 2, a fuel such as kerosene and an oxidant such as oxygen. Also, a fuel such as fuel oil and an oxidant such as oxygen. These conduits are controlled by respective shut-off valves 60, 61, 62 and 63. Pulsing valves 63a, 65, 66 and 67 are intermittently opened and closed by arms 64, 68, 69 and 70 actuated by means of a lever 71 in turn reciprocated by a conventional crank 72 which is belted to a pulley 74, in turn driven by a motor 76. The lever 71 operates to rotate the arms 64, 68, 69 and 70 which vary the respective valve openings. Additional control valves 80, 82, 84 and 86 may be employed and utilized in some desirable setting to limit the flow of fluids through the respective pulsing valves 63a, 65, 66 and 67 in some desired alternating relationship.

One practical application of using an alternating form of fuel, such as suggested by the arrangement of Fig. 2, might comprise operating a low energy flame on compressed air, for example, and a high energy flame on commercial oxygen.

While I have disclosed preferred embodiments of the invention as noted above, it is further intended that various other changes and modifications may be resorted to within the scope of the appended claims.

Having thus described my invention, what I claim is:

1. Method of flame working a spallable mineral body which comprises burning a confined mixture of fuel and oxidant at super atmospheric pressure to produce a flame of predetermined energy, directing the flame against the said material and periodically varying the flow of fuel and oxidant to alter the energy characteristics of the flame in a predetermined manner while the flame is in contact with the said spallable mineral body.

2. Method of flame working a mineral body characterized by a spallable grain structure which method comprises applying at a localized area of the mineral body a relatively low energy flame to induce a partial separation of constituent granular portions of the mineral body along grain interfaces and then subjecting the partly separated granular portions to a relatively high velocity high energy flame to dislodge the partly granular portions and produce a spalled material.

References Cited in the file of this patent

UNITED STATES PATENTS

| | | |
|---|---|---|
| 65,677 | Johnson et al. | June 11, 1867 |
| 2,130,329 | Sammons | Sept. 13, 1938 |
| 2,464,351 | Shorter | Mar. 15, 1949 |
| 2,548,463 | Blood | Apr. 10, 1951 |
| 2,714,563 | Poorman et al. | Aug. 2, 1955 |